United States Patent [19]

Shimizu et al.

[11] Patent Number: 5,490,013
[45] Date of Patent: Feb. 6, 1996

[54] COMPENSATION PLATE FOR TILTED PLATE OPTICAL ABERRATIONS

[75] Inventors: Jeffrey A. Shimizu, Peekskill; Peter J. Janssen, Scarborough, both of N.Y.

[73] Assignee: Philips Electronics North America Corporation, New York, N.Y.

[21] Appl. No.: 385,395

[22] Filed: Feb. 7, 1995

Related U.S. Application Data

[63] Continuation of Ser. No. 991,818, Dec. 17, 1992, abandoned.

[51] Int. Cl.⁶ .................................................. G02B 27/14
[52] U.S. Cl. ........................ 359/637; 359/634; 359/583
[58] Field of Search ................................ 359/637, 634, 359/737, 583; 353/84, 29

[56] References Cited

U.S. PATENT DOCUMENTS

| | | | |
|---|---|---|---|
| 2,792,740 | 5/1957 | Haynes | 359/637 |
| 3,794,407 | 2/1974 | Nishimura | 359/634 |
| 4,495,709 | 2/1984 | Iwata et al. | 350/447 |
| 4,541,688 | 9/1985 | Watt | 359/737 |
| 4,709,139 | 11/1987 | Nakamura | 359/726 |
| 4,836,649 | 6/1989 | Ledebuhr | 359/634 |
| 4,864,390 | 9/1989 | McKelhnie et al. | 359/49 |
| 5,073,013 | 12/1991 | Sonehara | 359/63 |
| 5,144,486 | 9/1992 | Hart | 359/637 |
| 5,200,857 | 4/1993 | Matsushita | 359/637 |
| 5,298,986 | 3/1994 | Owada | 348/762 |

FOREIGN PATENT DOCUMENTS

| | | | |
|---|---|---|---|
| 555245 | 2/1960 | Belgium | 359/637 |
| 2393334 | 12/1978 | France . | |
| 215230 | 9/1987 | Japan | 359/634 |
| 5-2149 | 1/1993 | Japan | 359/634 |
| 2155196 | 9/1985 | United Kingdom | 359/583 |
| 2162963 | 2/1986 | United Kingdom . | |

*Primary Examiner*—Georgia Y. Epps
*Assistant Examiner*—Ricky Mack
*Attorney, Agent, or Firm*—Paul R. Miller

[57] ABSTRACT

The present invention is directed to compensation plates for eliminating astigmatism and coma optical aberration in optical systems. In particular, the present invention can be used in LCD projection systems to compensate for aberrations in different color channels. This enables the production of LCD systems completely free of astigmatism and/or coma.

7 Claims, 2 Drawing Sheets

COMPENSATION PLATE FOR TILTED PLATE OPTICAL ABERRATIONS

This is a continuation of application Ser. No. 07/991,818, filed Dec. 17, 1992, abandoned.

The present invention is concerned with correction of various optical aberrations occurring upon light passing through a tilted plate by the use of a compensation plate to virtually eliminate such aberrations. In particular, the present invention has found that by rotating a second plate relative to a first tilted plate in an optical path, certain types optical aberrations, such as astigmatism and coma, are eliminated or minimized.

This compensation arrangement has been found to be especially useful in color LCD projection systems, for example, in compact path projection television systems, or in color TV cameras.

BACKGROUND OF THE INVENTION

The imaging of an object through a tilted plane parallel plate results in an image exhibiting aberration. Each of spherical aberration, coma, and astigmatism are introduced into the resulting image. Such aberrations occur whenever the light rays are converging or diverging through the plate. Examples of previous attempts to solve such aberrations may be seen in U.S. Pat. Nos. 2,792,740 and 4,541,688. Also, see W. J. Smith, *Modern Optical Engineering*, McGraw Hill, New York, 1990, page 99.

A common prior technique for reducing the effects of aberrations from a tilted filter or optical plate is to reduce the thickness of the filter. However, this approach is effective only up to a point. Since the filter is in the imaging path, it must have a good surface figure, or planarity. As the filter is made thinner, it becomes increasingly difficult to make it flat. Specifically, the filter is made as thin as possible, while still maintaining the surface figure or planarity. The remaining filter plate aberrations are then left uncorrected so as to provide a problematical solution as required resolution becomes better.

However, in the construction of high definition television systems, small LCD panels lead to compact systems, and pixel sizes become very small resulting in a demand for improved optical performance. Pixel sizes become of the order of 51 by 36 µm, but recombination filters can only be thinned to about 2.3 mm. Thinner filters typically have an unacceptable surface figure or flatness. A 2.3 mm thick filter introduces 52 µm of astigmatism, but this amount of astigmatism seriously degrades the resolution of a displayed image.

Another prior solution has been to collimate the imaging cone passed through the filter. This makes, the rays parallel to the axis at the filter. However, this technique requires additional imaging optics and substantially increases the optical path, thereby resulting in a more costly and more complex system.

It may be possible to account for filter aberrations by design of the imaging optics, but this option can result in a significant cost increase for lens design and manufacture. Furthermore, it is not appropriate for systems where one channel exhibits an aberration and another doesn't. For example, in a color LCD projector the green channel does not experience such aberrations since the green channel light is not passed through any filters or plates.

SUMMARY OF THE INVENTION

It has been found, particularly in compact path color projection systems, or in color TV cameras, that using a tilted compensation plate with a tilted filter offers a relatively simple and inexpensive solution for eliminating aberrations from such systems.

According to the present invention, the compensation plate is introduced with the filter plate to substantially eliminate aberrations, such as astigmatism and coma.

The compensation plate according to the present invention is simply a second optical plate of equal thickness and the same index of refraction as the filter plate placed in the same optical path. The compensation plate has a tilt angle with respect to the optical axis equal to that of the original tilted filter, but is rotated 90° about the optical axis or optical path of the light.

The compensation plate introduces aberration equal to that of the original tilted plate, however, this aberration is rotated by 90° with respect to the aberration produced by the original filter plate. Spherical aberration is doubled since it is a circularly symmetrical aberration. Coma from a single plate is oriented along the axis of tilt and the combination gives coma with a magnitude of √2 times that of the single plate but oriented 45° to vertical and horizontal axes perpendicular to the optical axis. Astigmatism is reduced to zero although the astigmatism from the first plate results in a decrease in power in the vertical direction while the second plate gives a decrease in power in the horizontal direction. The combination results in a symmetric decrease in power across the pupil so that a negative defocus is introduced. Accordingly, astigmatism becomes virtually zero although the image position is shifted.

It has been found that in order to eliminate the aberration of coma, a combination of plates rotated by 180° with respect to one another can be disposed relative to another such combination to eliminate coma. This second set of plates may then be rotated by 90° about the optical axis with respect to the other set of plates to eliminate astigmatism. Unfortunately, spherical aberration then becomes quadrupled, but its value is still very small in terms of both astigmatism and coma.

Such simple mechanism for solving optical aberrations can be used in light valve systems, such as in color TV cameras or color LCD receivers. In use in a LCD projection system, such as projection television receivers, a projection system using LCD components may be used similarly to that of U.S. Pat. No. 4,864,390 of which one of the inventors is common with the present application. In the system for a projection television apparatus, white light is passed into the system and divided into different wavelength optical paths to pass through LCD elements which modulate the different wavelengths of light. Upon recombination of the light and passing this light to a projection lens system, color images can be produced.

According to the present invention, the arrangement of the light paths is made such that the red light component passes only through its respective LCD and is then recombined with the remaining light for projection to the lens system. It has been found by the present inventors that upon incorporation of a compensation plate into the red light path before a recombination filter, at least the optical aberration of astigmatism is eliminated. The addition of a compensation plate in the other light paths, i.e., in the blue channel or the green channel, can be accomplished, but at the risk of increasing the distances from the LCDs to the projection lens system. It has been found that not compensating for the blue image creates no real difficulties since the blue image is visually least important as compared to the red and green images. The green light component doesn't need to be compensated since it never passes through any filter.

Thus, in a compact system of a high definition LCD projector, such as discussed above, the difficulties with the inability to reduce the thickness of the recombination filters beyond 2.3 mm are avoided by use of at least one compensation plate according to the present invention. For example, the placing of a compensation plate in the red channel can be easily done without alteration of the light path geometry since the compensation plate can easily fit into the empty space between the LCD and the last recombination filter. Such introduction of the compensation plate eliminates astigmatism, although leaving 9 μm of residual coma which is relatively small compared to the pixel size. Thus, the resolution of the image is significantly improved in a simple and inexpensive manner.

Accordingly, optical aberration introduced by the color filters or recombination filters may be easily controlled in a simple and inexpensive manner. For example, the performance of a three panel LCD system can be improved without altering any of the compact geometry of commonly employed optical systems.

The achievements of the present invention may be further understood by consideration of the fact that if an object is imaged through a tilted plane parallel plate, the resulting image exhibits aberrations. Spherical, coma and astigmatism aberrations are introduced to the image. This occurs whether the light rays are converging or diverging through the plate, such as shown in the prior art of FIG. 1. In FIG. 1 the plate 1' has a thickness t and an index of refraction of n. The plate is tilted by an angle θ', and the ray angle is represented θ". The corresponding paraxial quantities may be calculated as $$u_t = \tan(\theta') \quad (1)$$

$$u = \tan(\theta'') \quad (2)$$

The Seidel coefficients for spherical aberration $\sigma_1$, the aberration of coma $\sigma_2$, and astigmatism $\sigma_3$ are $$\sigma_1 = -\tfrac{1}{2} u^3 (t/n)(1 - 1/n^2) \quad (3)$$

$$\sigma_2 = -\tfrac{1}{2} u^2 u_t (t/n)(1 - 1/n^2)$$

$$\sigma_3 = -\tfrac{1}{2} u u_t^2 (t/n)(1 - 1/n^2)$$

where n is the index of refraction of the plate 1' and t is the thickness of the plate 1'. The Seidel coefficients are transverse measures of the blur radius at the image plane.

For an example, consider the plate 1' in FIG. 1 tilted at 45°. Suppose u=0.125 providing an imaging cone passing through the plate. The aberration coefficients as a function of plate thickness are plotted in FIG. 2 for an index of refraction of n=1.5. As may be seen in FIG. 2, the astigmatism A' is the dominant aberration, while both the coma aberration B' and the spherical aberration C' are small in comparison.

The additional compensation plate according to the present invention provides in combination with a tilted plane parallel plate a correction of these aberration coefficients. The present invention eliminates by the use of a compensation plate astigmatism in its entirety, while the present invention through a second embodiment provides elimination of the coma aberration, as well. This second embodiment includes a combination of the compensation plates at 90° with one another further rotated by 180° with respect to a similar set of combination plates.

BRIEF DESCRIPTION OF THE DRAWING FIGURE

The present invention will now be described in terms of the following drawing figures in which FIG. 1 represents the prior art use of a single tilted filter or plate;

DESCRIPTION OF THE INVENTION

Figure 3:
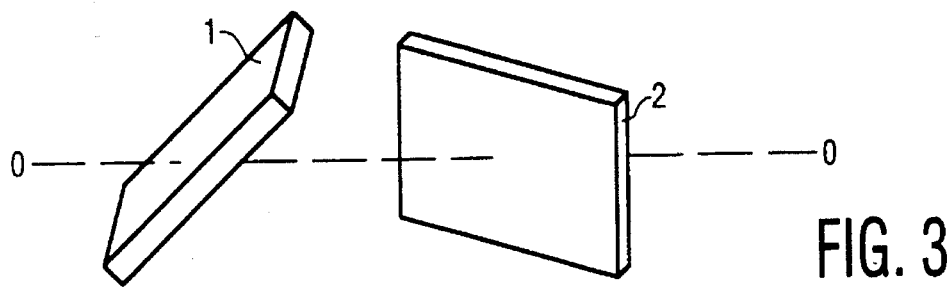
FIG. 3 shows the corrected system provided by the present invention.

The compensation plate of the present invention may be seen by reference to FIG. 3 in which a filter or plate 1 is provided on the optical axis 0—0. In order to compensate for astigmatism arising from optical images produced through the tilted plate, a compensation plate 2 is provided on the optical axis 0—0, but rotated by 90° from the orientation of the plate 1.

Figure 1:
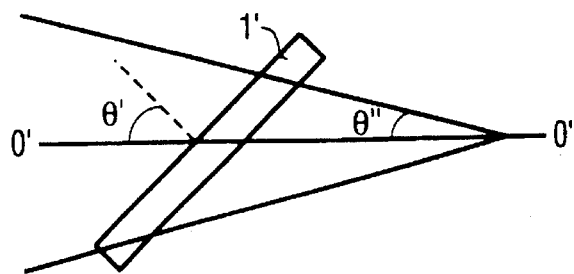
Figure 2:
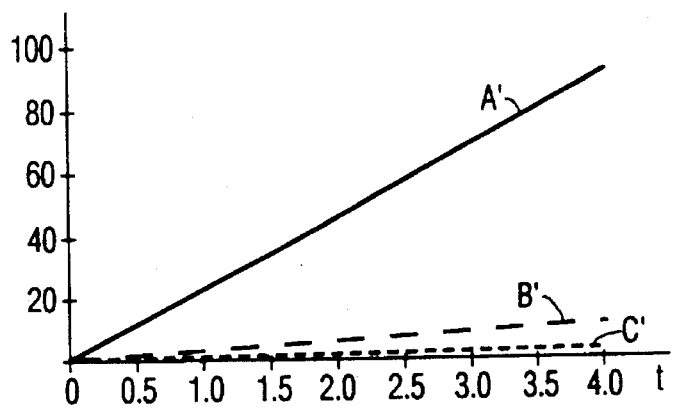
FIG. 2 represents a plot of the aberration coefficients for the prior art plate of FIG. 1.
Figure 4:
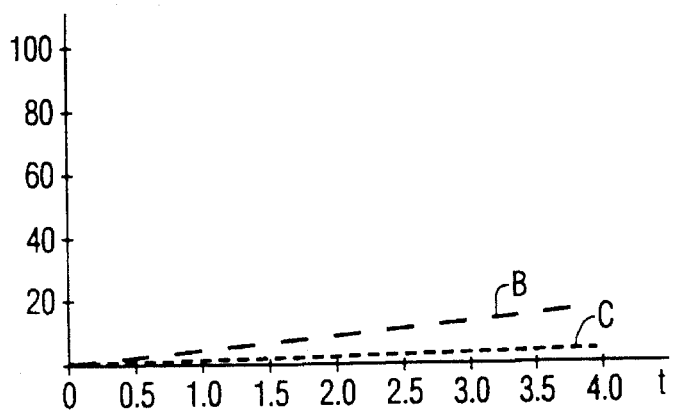
FIG. 4 illustrates graphically the elimination of the astigmatism aberration according to FIG. 3.

This combination of plates or filters, as seen in FIG. 3 completely eliminates aberrations due to astigmatism, as may be seen relative to the graph of FIG. 4. In this graph, astigmatism, such as shown in FIG. 2, has been eliminated. The compensation plate 2 introduces aberrations equal to that of the plate or filter 1, but these aberrations are rotated 90°. Thus, the coma B has increased over that of FIG. 2 by an amount of the square root of 2. The spherical aberration shown by the line C in FIG. 4 has doubled over that of C' in FIG. 2 because it is a circularly symmetrical aberration.

The astigmatism from the first plate 1 results in a decrease in power in a vertical direction while the second plate gives a decrease in power in a horizontal direction perpendicular to the axis 0—0. The combination results in a symmetric decrease in power across the pupil, and a negative defocus is introduced. Astigmatism becomes zero and the image position is shifted.

From this combination of plates of FIG. 3, the aberrations are significantly compensated compared to that of the single plate, as may be seen by FIG. 4.

Figure 5:
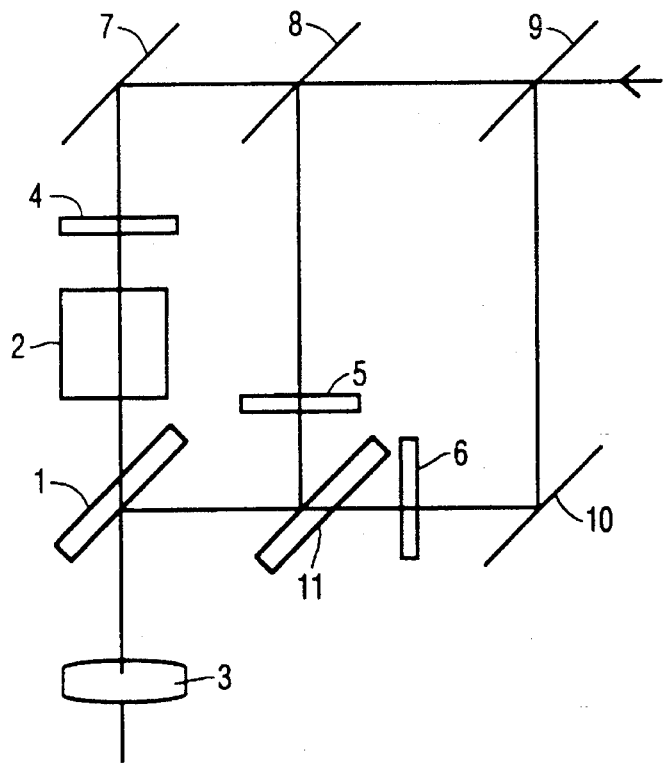
FIG. 5 illustrates the compensation plate of the present invention in use in a LCD projection system according to the present invention.

The use of such compensation system according to the present invention may be provided in a light valve system, such as an LCD projector as seen in FIG. 5. White light is introduced into the system at the partial reflector 9 which has a dichroic coating to breakup the white light into various wavelength components. A blue component is reflected to the reflector 10 to pass through the LCD 6 modulating the blue color. The red and green components pass through the filter 9 to the dichroic filter 8 which reflects green light to the LCD 5 and passes red light to the LCD 4 by way of the reflector 7. The light modulated by passing through the LCD panels 5 and 6 is recombined at the recombination filter 11 and passed to the recombination filter 1.

Red light passing through the LCD panel 4 is compensated by way of the compensation plate 2 before striking the recombination filter 1. These components are rotated at 90° with respect to one another and completely eliminate astigmatism in the red channel. After the light passes through the recombination filter 1, it is combined or recombined with the blue and green light from the combination filter 11 and passes onto the projection lens system 3.

In this example of FIG. 5, only the red channel has been provided with a compensation filter to eliminate astigmatism in the red channel. In compact systems the red channel has sufficient space to accommodate the compensation filter 2 without a system redesign. The degradation of the image projected to the projection lens system 3 is relatively small by only compensating the red channel since the blue channel contributes less visual information than the red channel or the green channel. Moreover, the green channel light does not pass through any filters since it is reflected from the surface of the recombination filter 11 and from the surface of the recombination filter 1. Accordingly, the green channel does not experience any aberration since it is not passed through any filters after passing through the LCD 5.

Consequently, the compensation plate concept of the present invention provides a significantly improved LCD projector system by reducing aberrations from light passing through tilted plates in a relatively simple manner.

Figure 6:
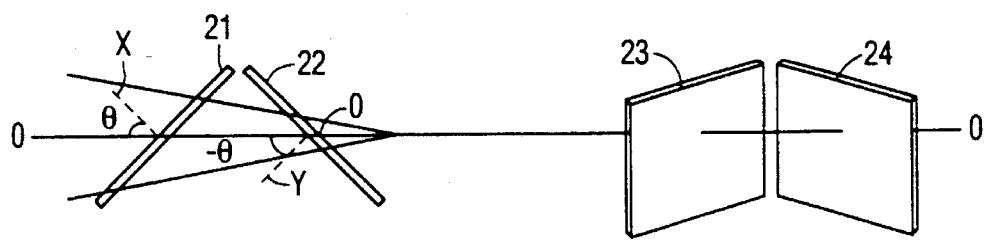
FIG. 6 shows a combination of two sets of compensation plates according to a second embodiment of the present invention.
Figure 7:
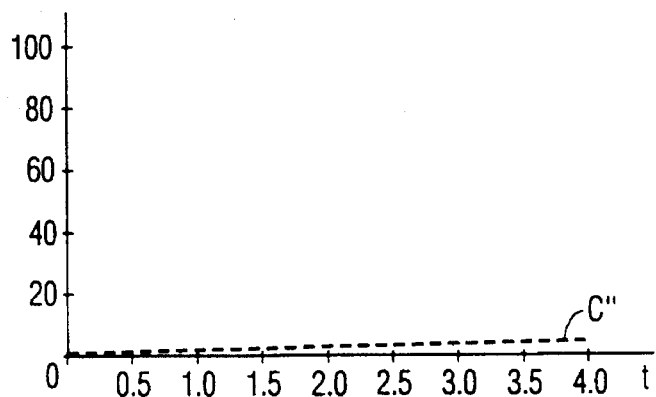
FIG. 7 is a graphic plot of the remaining aberration obtained by the arrangement of FIG. 6.

In FIG. 6, a technique is shown for eliminating the coma aberration that exists, as seen in FIG. 4. In this respect, FIG. 6 provides two compensation plates or filters 21 and 22 at right angles to each other or rotated by 180° from one another to effectively eliminate coma. This arrangement may be combined with the compensation filters 23 and 24 which are rotated at 90° about the optical axis 0—0 to also eliminate astigmatism. Accordingly, the arrangement in FIG. 6 eliminates both astigmatism and coma, as may be seen by the graph of FIG. 7 in which only spherical aberration C" remains. This spherical aberration has been increased by four times from that of a single filter or plate, but it is still a small component and both coma and astigmatism have been eliminated.

Consequently, significant improvement of both convergent and divergent light transmitted through a tilted plate can be corrected according to the present invention. That is, by using one compensation plate, astigmatism can be eliminated or by using a combination of compensation plates both astigmatism and coma can be eliminated from the optical image. This is particularly fruitful in use in a LCD projection system, such as a compact television receiver, or in a compact camera.

The various filters and compensation plates as shown in the present application all have the same thickness and the same index of refraction. Each of these filter substrates include the same material, whether dichroic or otherwise.

What we claim:

1. A color light valve system comprising beam splitting means for splitting light into respective optical paths and respective different wavelengths; light valve means disposed in each of said optical paths for modulating red, green and blue light; means for combining the modulated red, green and blue light; means for projecting the combined light to a display; and compensation means disposed in at least one of said optical paths for eliminating optical aberrations, wherein said at least one of said optical paths is the optical path for red light, said compensation means comprising at least a first tilted plane-parallel plate disposed in said one optical path for red light, said first plate producing aberrations of an optical image, and at least a second tilted plane-parallel plate disposed in said optical path for red light, said second plate having been rotated about the optical axis by 90 degrees with respect to said first plate to virtually eliminate at least one of astigmatism and coma aberrations.

2. A color light valve system according to claim 1, wherein said second tilted, plane-parallel plate has a tilt angle equal to that of said first tilted plane-parallel plate, said second tilted plane-parallel plate being rotated by 90° about said at least one of said optical paths to completely eliminate astigmatism aberrations in said at least one optical path.

3. A color light valve system according to claim 2, wherein at least one third tilted plane-parallel plate is disposed in said at least one of said optical paths, said at least one third tilted plane-parallel plate being rotated by 180° with respect to said first and second tilted plane-parallel plates, said at least one third tilted plane-parallel plate also eliminating coma aberrations in said at least one optical path.

4. A color light valve system according to claim 3, wherein a fourth tilted plane-parallel plate is disposed at a rotation of 90° with respect to said third tilted plane-parallel plate in said at least one optical path, and wherein said third and fourth tilted plane-parallel plates are disposed at a rotation of 180° with respect to said first and second tilted plane-parallel plates, said combination of first, second, third and fourth tilted plane-parallel plates completely eliminating both astigmatism and coma aberrations.

5. A color light valve system according to claim 1, wherein at least one third tilted plane-parallel plate is disposed in said at least one of said optical paths, said at least one third tilted plane-parallel plate eliminating coma aberrations in said at least one optical path.

6. A color light valve system according to claim 5, wherein a fourth tilted plane-parallel plate is disposed at a rotation of 90° about said at least one optical path with respect to said third tilted plane-parallel plate, and wherein said third and fourth tilted plane-parallel plates are disposed at a rotation of 180° with respect to said first and second tilted plane-parallel plates, said combination of first, second, third and fourth tilted plane-parallel plates completely eliminating both astigmatism and coma aberrations.

7. A color light valve system according to claim 1, wherein said light valve means are LCD elements.

\* \* \* \* \*